April 2, 1935.　　　P. O. TROUTMAN　　　1,996,263
FOUR-WHEEL BRAKE EQUALIZER
Filed Oct. 23, 1929　　　3 Sheets-Sheet 1
Fig. 1.
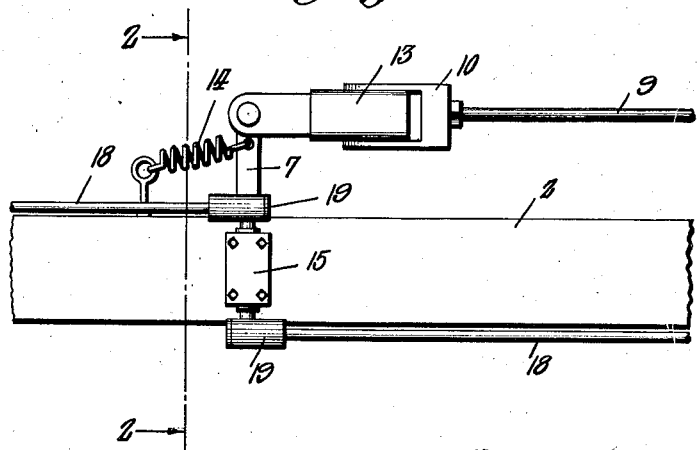
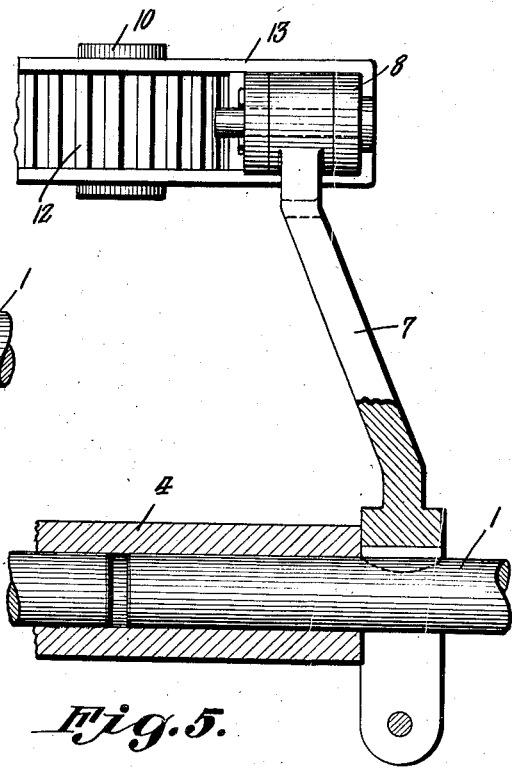
Fig. 4.
Fig. 5.
Phillip O. Troutman,
INVENTOR
BY Victor J. Evans
ATTORNEY April 2, 1935.   P. O. TROUTMAN   1,996,263
FOUR-WHEEL BRAKE EQUALIZER
Filed Oct. 23, 1929   3 Sheets-Sheet 2

Phillip O. Troutman,
INVENTOR

BY Victor J. Evans
ATTORNEY

April 2, 1935. P. O. TROUTMAN 1,996,263
FOUR-WHEEL BRAKE EQUALIZER
Filed Oct. 23, 1929   3 Sheets-Sheet 3
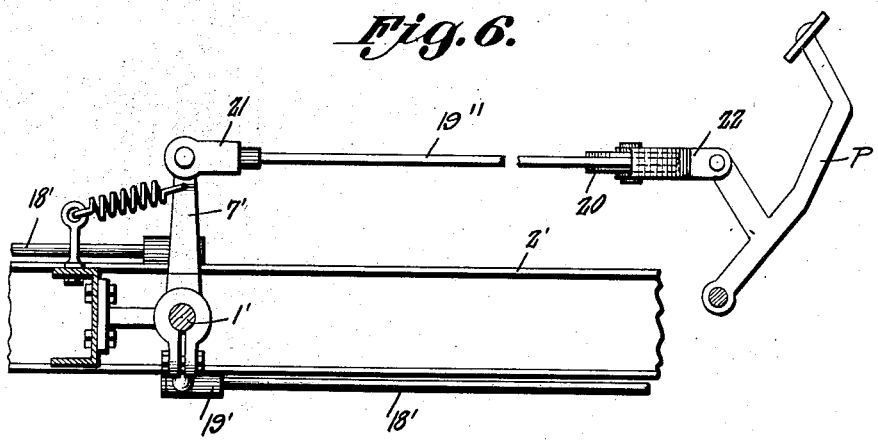
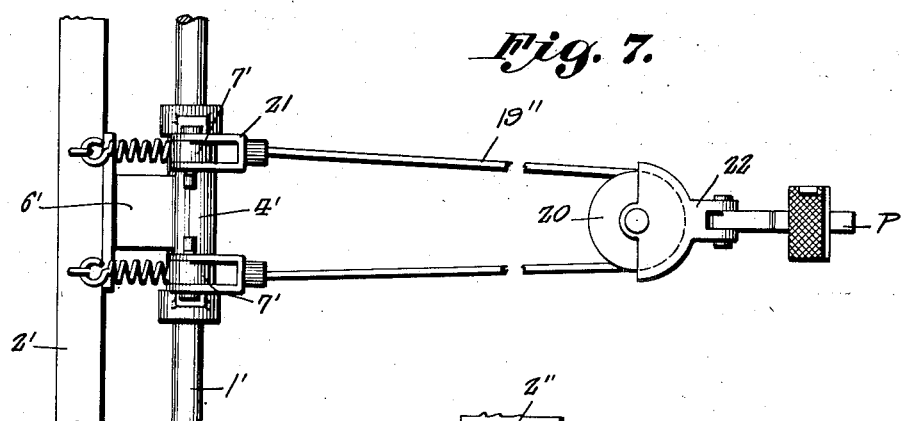
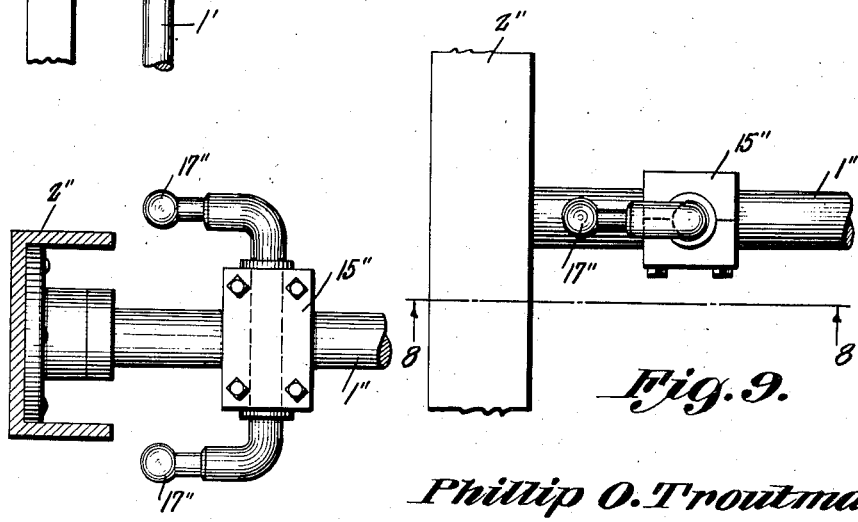
Phillip O. Troutman, INVENTOR
BY Victor J. Evans ATTORNEY Patented Apr. 2, 1935

1,996,263

UNITED STATES PATENT OFFICE 1,996,263

FOUR-WHEEL BRAKE EQUALIZER

Phillip O. Troutman, Pittsburgh, Pa., assignor to Bendix Brake Company, South Bend, Ind., a corporation of Illinois Application October 23, 1929, Serial No. 401,770

14 Claims. (Cl. 188—204)

This invention relates to an automatic brake equalizer for four wheel brakes, the general object of the invention being to provide means whereby all four brakes are evenly applied when the braking system is moved into operative position, even though the brakes are not adjusted the same on all four wheels.

Another object of the invention is to so construct and arrange the parts that adjustment can be made by the owner of a vehicle without calling in a skilled mechanic.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation showing a portion of a chassis of a vehicle, with the invention thereon.

Figure 4 is a section on line 4—4 of Figure 3.

Figure 5 is a section on line 5—5 of Figure 3.

Figure 6 is a fragmentary sectional view showing a modification.

Figure 7 is a plan view of such modification.

Figure 8 is a section on line 8—8 of Figure 9.

Figure 9 is a fragmentary top plan view.

Figure 2:
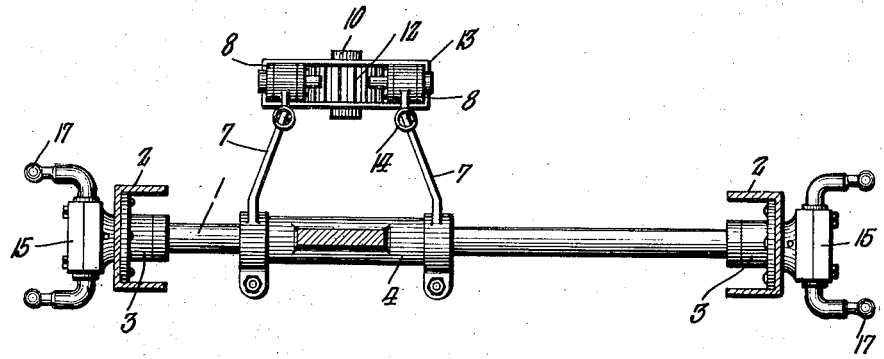
Figure 2 is a section on line 2—2 of Figure 1.
Figure 3:
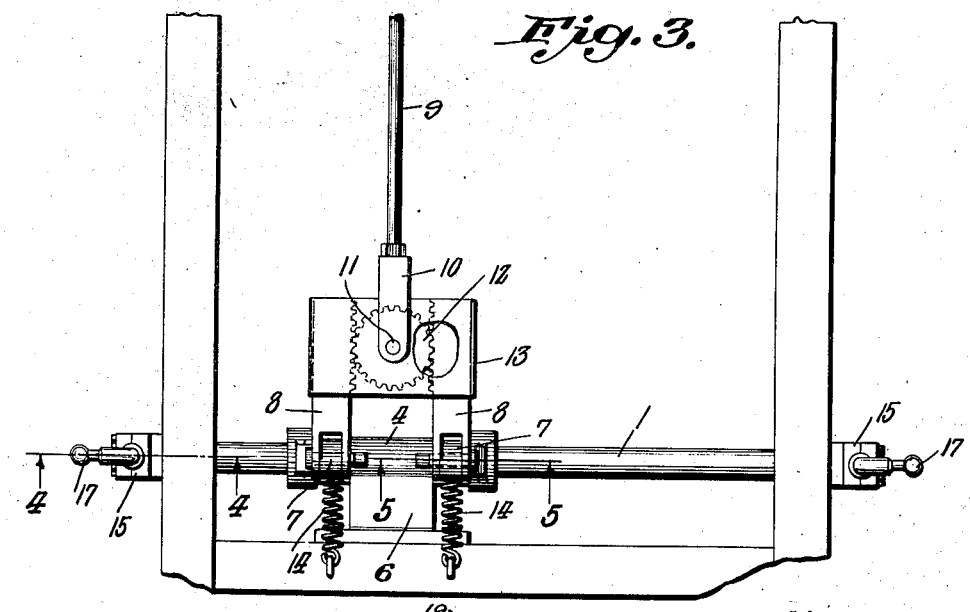
Figure 3 is a top plan view of Figure 1.

In these drawings, the numeral 1 indicates a sectional shaft having its outer ends journaled in the side members 2 of the chassis of the vehicle, as shown at 3, with the adjacent ends of the two sections journaled in a tubular part 4 formed on a bracket 6 which is fastened to one of the cross pieces of the chassis. An arm 7 is connected with each section of the shaft, one arm abutting one end of the tubular part 4 and the other the opposite end thereof, these arms extending upwardly and being pivotally connected at their upper ends with the rear ends of the rack bars 8. A rod 9 has its front end connected with the brake pedal or lever of the vehicle and its rear end has a clevis 10 thereon, the rear end of which carries a stub shaft 11 which is vertically arranged and which carries a toothed wheel 12 which meshes with the teeth of the rack bars 8, it being seen that these rack bars are arranged at opposite sides of the toothed wheel. A casing 13 is connected with the clevis 10 by the ends of the shaft 11 and this casing surrounds the toothed portions of the rack bars and the toothed wheel, as shown in Figure 3. A spring 14 connects each arm 7 with a part on the cross bar of the chassis and tends to hold the arms in upright position.

A vertically arranged bearing 15 is carried by the outer end of each section of the shaft 1 and a vertically arranged trunnion shaft 16 passes through each bearing and has its ends bent at rightangles outwardly, with the extremities of said ends formed with the spherical parts 17.

The rods 18, which extend to the front and rear brakes, are each provided with an enlargement 19 having a spherical socket therein for receiving the spherical part 17, the rods for the front brakes being connected with the lower spherical parts and the rods for the rear brakes being connected with the upper spherical parts.

Figure 10:
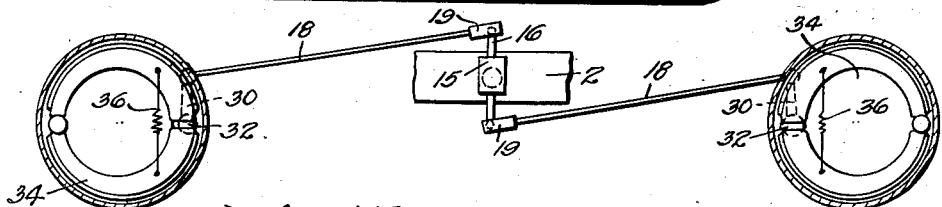
Figure 10 is a fragmentary side view of the brake applying connections.

The brake rods 18 are connected at their outer ends (Figure 10) to levers 30 having cams 32 which serve to apply the brakes 34 against the action of return springs 36. The return springs 36 are sufficiently strong to return the shafts 16 to their neutral positions when the foot pedal pressure is released.

From the foregoing it will be seen that when the pedal is depressed, the rod 9 is moved forwardly so that the toothed wheel 12 will move forwardly the rack bars 8, thus rocking the shaft 1 through means of the arms 7 so that a pull is exerted on the brake rods 18 to apply the brakes. If one of the brake bands should engage its drum in advance of the other bands, further movement of the parts connected with this band will be prevented so that the rack bar, connected with said band, would come to rest and thus cause the toothed wheel to move over the same and thereby cause said wheel to advance the other rack bar so that the bands connected with said other rack bar will be moved a greater distance than the first bar and thus all the brakes will be applied. Thus the device is automatic in operaion and will apply the brakes evenly, even though the bands on the different wheels are adjusted unequally. The use of this device will tend to prevent accidents and will prevent undue wear of the tires and brakes.

In the modification shown in Figures 6, 7, 8 and 9, a cable 19'' and pulley 20 are substituted for the rack means, the cable having its ends fastened to the arms 7' by the clevices 21, the cable passing around the pulley and the housing 22 of the pulley being connected to the pedal P, so that when the pedal is depressed, the cable will rock the sectional shaft through means of the arms 7' and then, if one band engages its drum before he other bands, the arm connected with said band will come to rest so that the pulley will move over the cable and thus continue to move the second arm until the brakes connected with said second arm are applied. In other respects, this form of the invention is similar to that first described.

The trunnion carrying shafts can be connected to either the ends of the shaft 1 when said shaft passes through the side members of the chassis, as shown in the first form of the invention, or said trunnion shafts can be connected with the cross shaft an appreciable distance from the ends thereof, as shown in the second form of the invention, which shows the bearings for the section shaft arranged on the inner faces of the side members of the chassis.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. Brake equalizing means comprising a sectional cross shaft, means for supporting the same for rocking movement, an arm connected with each section of the shaft, manually operated means including means for moving both arms simultaneously to rock the shaft and permitting one arm to be moved after the other arm ceases to move, due to the brakes being unequally adjusted, split cross bearings fixed to the outer portions of the sections of the shaft, and trunnion members in the bearings and having outturned extensions swiveled to connections with the brakes.

2. In combination with a vehicle and its brakes and the brake operating member, a sectional shaft supported for rocking movement in the vehicle, upper and lower trunnions, means detachably connecting the trunnions with each section of the shaft, brake rods swiveled to the lower trunnions and connected with the brakes of one pair of wheels, brake rods swiveled to the upper trunnions and connected with the brakes of the other pair of wheels, an arm connected with each section of the shaft, and means for connecting the arms with the brake applying member whereby both arms will be moved simultaneously by said member until one arm is prevented from moving by the application of the brakes connected therewith, the other arm continuing to move until the brakes connected therewith are applied.

3. In combination with a vehicle and its brakes and the brake applying member, a sectional shaft supported for rocking movement in the vehicle, a vertical bearing member connected with each section, a vertically arranged trunnion shaft carried by each bearing member, the ends of each shaft being bent at right angles and having spherical members at their extremities, brake rod members having spherical sockets therein for receiving the spherical members, the rods connected with the lower trunnions being connected with the brakes of the other pair of wheels, an arm connected with each section of the shaft, spring means connected with the arms and tending to hold them in a certain position, shiftable means connected with both arms, and means connected with the brake applying member and coacting with the shiftable means for actuating the arms.

4. In combination with a vehicle and its brakes and the brake applying member, a sectional shaft supported for rocking movement in the vehicle, a vertical bearing member connected with each section, a vertically arranged trunnion shaft carried by each bearing member, the ends of each shaft being bent at right angles and having spherical members at their extremities, brake rod members having spherical sockets therein for receiving the spherical members, the rods connected with the lower trunnions being connected with the brakes of one pair of wheels and the rods connected with the other trunnions being connected with the brakes of the other set of wheels, an arm connected with each section of the shaft, spring means connected with the arms and tending to hold them in a certain position, a cable having its ends connected with the arms and a pulley connected with the brake applying member and over which the cable passes.

5. In combination with a vehicle and its brakes and the brake applying member, a sectional shaft supported for rocking movement in the vehicle, a vertical bearing member connected with each section, a vertically arranged trunnion shaft carried by each bearing member, the ends of each trunnion shaft being bent at right angles and having spherical members at their extremities, brake rod members having spherical sockets therein for receiving the spherical members, the rods connected with the lower trunnions being connected with the brakes of one pair of wheels and the rods connected with the other trunnions being connected with the brakes of the other pair of wheels, an arm connected with each section of the shaft, spring means connected with the arms and tending to hold them in a certain position, a rack bar connected with each arm, a rod connected with the brake applying member and a toothed wheel carried by the rod and engaging the teeth of the racks.

6. A brake operating mechanism comprising a rotatable cross shaft part having two angle shaped arms extending from one end thereof, each mounted to swivel therein providing for angular movement of the ends of said arms about the axis of the arms.

7. An equalized braking system including an actuating shaft, means for oscillating said shaft, a housing secured to said shaft, a second shaft having a bearing within said housing permitting oscillatory movement thereof about an axis angularly related to the axis of oscillation of the first shaft, arms extending laterally from said second shaft, and connections from said arms to a pair of brakes.

8. An equalized braking system including an actuating shaft, means for oscillating said shaft, a housing secured to said shaft, a second shaft having a bearing within said housing permitting oscillatory movement thereof about an axis angularly related to the axis of oscillation of the first shaft, said second shaft having portions extending in opposite directions beyond said first shaft, arms extending laterally from said second shaft upon opposite sides of the axis of said first shaft, and connections from said arms to a pair of brakes.

9. An equalized braking system including an actuating shaft, means for oscillating said shaft, a housing secured to said shaft, a second shaft having a bearing within said housing permitting oscillatory movement thereof about an axis extending substantially at right angles to the axis of oscillation of the first shaft, arms extending laterally from said second shaft, and connections from said arms to a pair of brakes.

10. An equalized braking system including an actuating shaft, means for oscillating said shaft, a housing secured to said shaft, a second shaft having a bearing within said housing permitting oscillatory movement thereof about an axis angularly related to the axis of oscillation of the first shaft, said housing serving as a means for maintaining said second shaft in predetermined angular relation with respect thereto, arms extending laterally from said second shaft, and connections from said arms to a pair of brakes.

11. An equalized braking system for operating a pair of brakes including an actuating shaft, means for oscillating said shaft, a second shaft connected thereto, means for mounting said second shaft for oscillatory movement about an axis angularly related to the axis of oscillation of the first shaft, and a plurality of means having effective connections to said second shaft at points spaced from the axis for connecting said second shaft to said brakes.

12. An equalized braking system including an oscillating shaft adapted to afford an equalized braking connection between a pair of brakes, and means for returning said shaft to a predetermined angular position after the application of the brakes.

13. A braking system including, in combination, an actuating shaft, an equalizing shaft, and means for yieldingly urging said equalizing shaft to a neutral position.

14. In combination with a vehicle and its brakes and the brake applying member, a shaft supported for rocking movement in the vehicle, a vertical bearing member connected with each end of the shaft, a vertically arranged trunnion shaft carried by each bearing member, the ends of each trunnion shaft being bent at right angles and having spherical members at their extremities, and tension members connected with the brakes having spherical sockets therein for receiving the spherical members.

PHILLIP O. TROUTMAN.